United States Patent
Raghavan et al.

(10) Patent No.: US 12,301,496 B2
(45) Date of Patent: May 13, 2025

(54) UPLINK COMPOSITE BEAM SYNTHESIS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 16/948,895

(22) Filed: Oct. 5, 2020

(65) Prior Publication Data

US 2022/0021493 A1 Jan. 20, 2022

Related U.S. Application Data

(60) Provisional application No. 62/705,815, filed on Jul. 16, 2020.

(51) Int. Cl.
*H04L 5/00* (2006.01)
*H04B 7/0408* (2017.01)
*H04B 7/06* (2006.01)

(52) U.S. Cl.
CPC ........... *H04L 5/005* (2013.01); *H04B 7/0408* (2013.01); *H04B 7/0617* (2013.01)

(58) Field of Classification Search
CPC ...... H04L 5/005; H04B 7/0408; H04B 7/0617
See application file for complete search history.

(56) References Cited

U.S. PATENT DOCUMENTS

| 7,471,702 | B2 * | 12/2008 | Laroia | H04L 5/0044 |
| | | | | 375/348 |
| 2011/0310818 | A1 * | 12/2011 | Lin | H04L 5/0048 |
| | | | | 370/328 |
| 2015/0333894 | A1 * | 11/2015 | Wang | H04B 7/0452 |
| | | | | 370/329 |
| 2018/0206132 | A1 * | 7/2018 | Guo | H04W 72/0473 |
| 2019/0052424 | A1 * | 2/2019 | Manolakos | H04W 72/23 |
| 2019/0149382 | A1 | 5/2019 | Ko et al. | |

(Continued)

FOREIGN PATENT DOCUMENTS

| WO | WO-2019029675 A1 | 2/2019 |
| WO | WO-2021128258 A1 | 7/2021 |

OTHER PUBLICATIONS

International Search Report and Written Opinion—PCT/US2021/070755—ISA/EPO—Nov. 18, 2021.

(Continued)

*Primary Examiner* — Joseph A Bednash
(74) *Attorney, Agent, or Firm* — Harrity & Harrity, LLP

(57) ABSTRACT

Various aspects of the present disclosure generally relate to wireless communication. In some aspects, a user equipment (UE) may transmit sounding reference signals (SRSs) on a plurality of beams to a base station using a set of SRS resources indicated by the base station. The UE may receive, from the base station, an SRS resource indicator indicating one or more SRS resources of the set of SRS resources and determine a combined transmit beam from the plurality of beams based at least in part on the SRS resource indicator. Numerous other aspects are provided.

30 Claims, 8 Drawing Sheets

(56) References Cited

U.S. PATENT DOCUMENTS

2019/0373592 A1* 12/2019 Ji ........................ H04B 7/063
2021/0306055 A1* 9/2021 Farag .................. H04W 72/23

OTHER PUBLICATIONS

Huawei, et al., "Codebook Based Transmission for Ul Mimo", 3GPP Draft, R1-1709206, 3GPP TSG RAN WG1 Meeting #89, 3rd Generation Partnership Project (3GPP), Mobile Competence Centre, 650, Route Des Lucioles, F-06921 Sophia-Antipolis Cedex, France, vol. RAN WG1. No. Hangzhou. China, May 15, 2017-May 19, 2017, May 16, 2017 (May 16, 2017), XP051285016, 10 Pages, Retrieved from the Internet: URL:http://www.3gpp.org/ftp/tsg_ran/WG1_RL1/TSGR1_89/Docs/ [retrieved on May 16, 2017] p. 1-p. 4.
Ntt Docomo: "General Views on QCL Design for NR", 3GPP Draft, 3GPP Tsg Ran WG1 Meeting #90, R1-1713926_NR_QCL, 3rd Generation Partnership Project (3GPP), Mobile Competence Centre, 650, Route Des Lucioles, F-06921 Sophia-Antipolis Cedex, France, vol. RAN WG1. No. Prague. Czechia, Aug. 21, 2017-Aug. 25, 2017, Aug. 20, 2017 (Aug. 20, 2017), XP051316718, pp. 1-6, Retrieved from the Internet: URL:http://www.3gpp.org/ftp/Meetings_3GPP_SYNC/RAN1/Docs/ [retrieved on Aug. 20, 2017] p. 3.
Partial International Search Report—PCT/US2021/070755—ISA/EPO—Sep. 28, 2021.
Taiwan Search Report—TW110123044—TIPO—Oct. 17, 2024.

* cited by examiner

UPLINK COMPOSITE BEAM SYNTHESIS

CROSS-REFERENCE TO RELATED APPLICATION

This Patent Application claims priority to U.S. Provisional Patent Application No. 62/705,815, filed on Jul. 16, 2020, entitled "UPLINK COMPOSITE BEAM SYNTHESIS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for synthesizing an uplink composite beam.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting sounding reference signals (SRSs) on a plurality of beams to a base station using a set of SRS resources indicated by the base station. The method also includes receiving, from the base station, an SRS resource indicator indicating one or more SRS resources of the set of SRS resources and determining a combined transmit beam from the plurality of beams based at least in part on the SRS resource indicator.

In some aspects, a method of wireless communication performed by a base station includes determining a set of SRS resources to provide to a UE based at least in part on feedback for one or more signals transmitted to the UE and transmitting an indication of the set of SRS resources to the UE for use in beam training. The method also includes determining one or more SRS resources for the UE from the set of SRS resources based at least in part on measurements of SRSs received with the set of SRS resources on a plurality of beams from the UE, transmitting an SRS resource indicator to the UE, the SRS resource indicator indicating the one or more SRS resources of the set of SRS resources, and receiving, from the UE, communications on a combined transmit beam that is combined from a plurality of beams based at least in part on the one or more SRS resources.

In some aspects, a UE for wireless communication includes a memory and one or more processors operatively coupled to the memory, the memory and the one or more processors configured to transmit SRSs on a plurality of beams to a base station using a set of SRS resources indicated by the base station, receive, from the base station, an SRS resource indicator indicating one or more SRS resources of the set of SRS resources, and determine a combined transmit beam from the plurality of beams based at least in part on the SRS resource indicator.

In some aspects, a base station for wireless communication includes a memory and one or more processors operatively coupled to the memory, the memory and the one or more processors configured to determine a set of SRS resources to provide to a UE based at least in part on feedback for one or more signals transmitted to the UE and transmit an indication of the set of SRS resources to the UE for use in beam training. The memory and the one or more processors are configured to determine one or more SRS resources for the UE from the set of SRS resources based at least in part on measurements of SRSs received with the set of SRS resources on a plurality of beams from the UE, transmit an SRS resource indicator to the UE, the SRS resource indicator indicating the one or more SRS resources of the set of SRS resources, and receive, from the UE, communications on a combined transmit beam that is combined from a plurality of beams based at least in part on the one or more SRS resources.

In some aspects, a non-transitory computer-readable medium storing a set of instructions for wireless communication includes one or more instructions that, when executed by one or more processors of a UE, cause the UE to transmit SRSs on a plurality of beams to a base station using a set of SRS resources indicated by the base station, receive, from the base station, an SRS resource indicator indicating one or more SRS resources of the set of SRS resources, and determine a combined transmit beam from the plurality of beams based at least in part on the SRS resource indicator.

In some aspects, a non-transitory computer-readable medium storing a set of instructions for wireless communication includes one or more instructions that, when executed by one or more processors of a base station, cause the base station to determine a set of SRS resources to provide to a UE based at least in part on feedback for one or more signals transmitted to the UE, transmit an indication of the set of SRS resources to the UE for use in beam training, determine one or more SRS resources for the UE from the set of SRS resources based at least in part on measurements of SRSs received with the set of SRS resources on a plurality of beams from the UE, transmit an SRS resource indicator to the UE, the SRS resource indicator indicating the one or more SRS resources of the set of SRS resources, and receive, from the UE, communications on a combined transmit beam that is combined from a plurality of beams based at least in part on the one or more SRS resources.

In some aspects, an apparatus for wireless communication includes means for transmitting SRSs on a plurality of beams to a base station using a set of SRS resources indicated by the base station, means for receiving, from the base station, an SRS resource indicator indicating one or more SRS resources of the set of SRS resources, and means for determining a combined transmit beam from the plurality of beams based at least in part on the SRS resource indicator.

In some aspects, an apparatus for wireless communication includes means for determining a set of SRS resources to provide to a UE based at least in part on feedback for one or more signals transmitted to the UE, means for transmitting an indication of the set of SRS resources to the UE for use in beam training, means for determining one or more SRS resources for the UE from the set of SRS resources based at least in part on measurements of SRSs received with the set of SRS resources on a plurality of beams from the UE, means for transmitting an SRS resource indicator to the UE, the SRS resource indicator indicating the one or more SRS resources of the set of SRS resources, and means for receiving, from the UE, communications on a combined transmit beam that is combined from a plurality of beams based at least in part on the one or more SRS resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
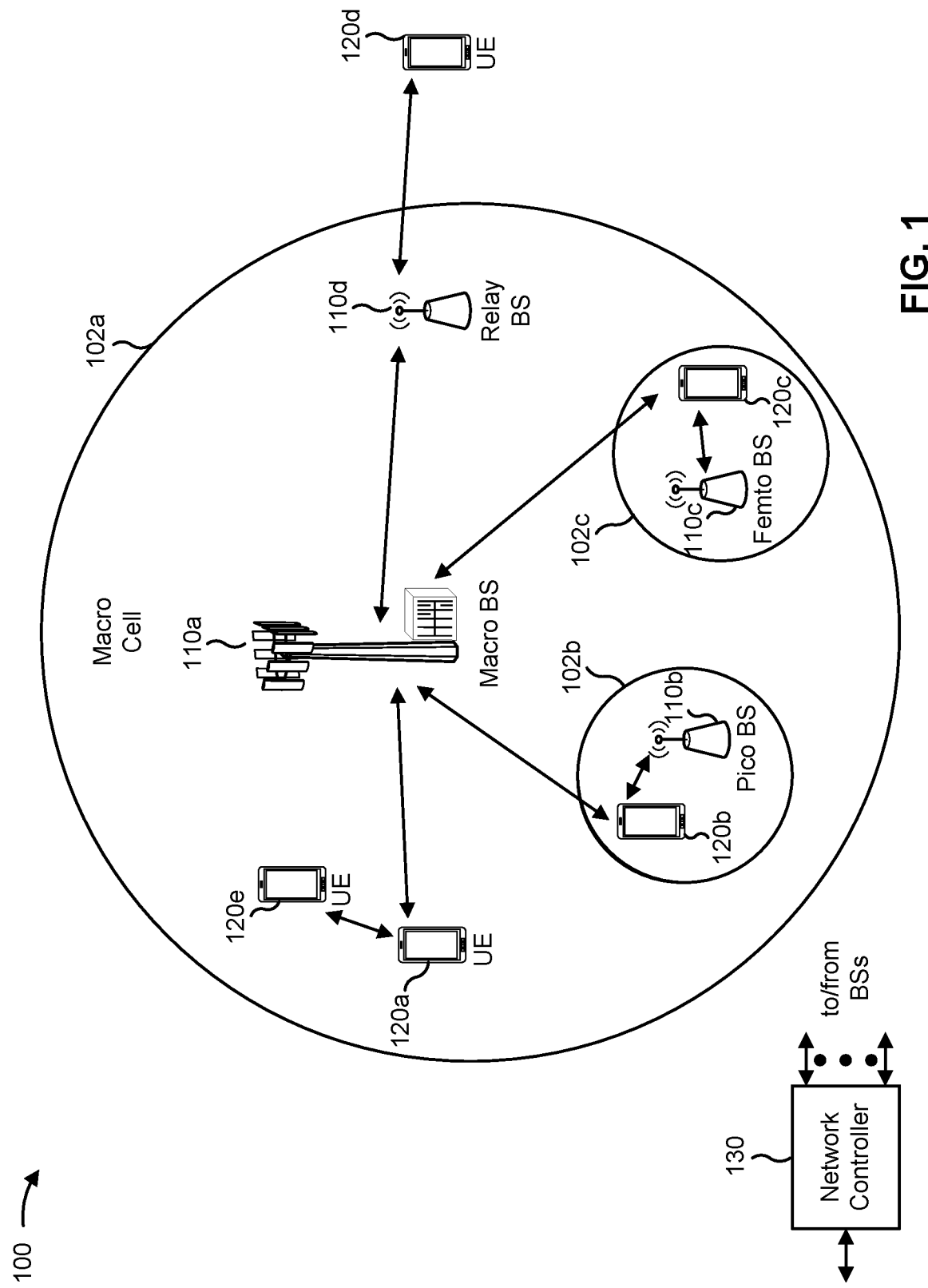
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
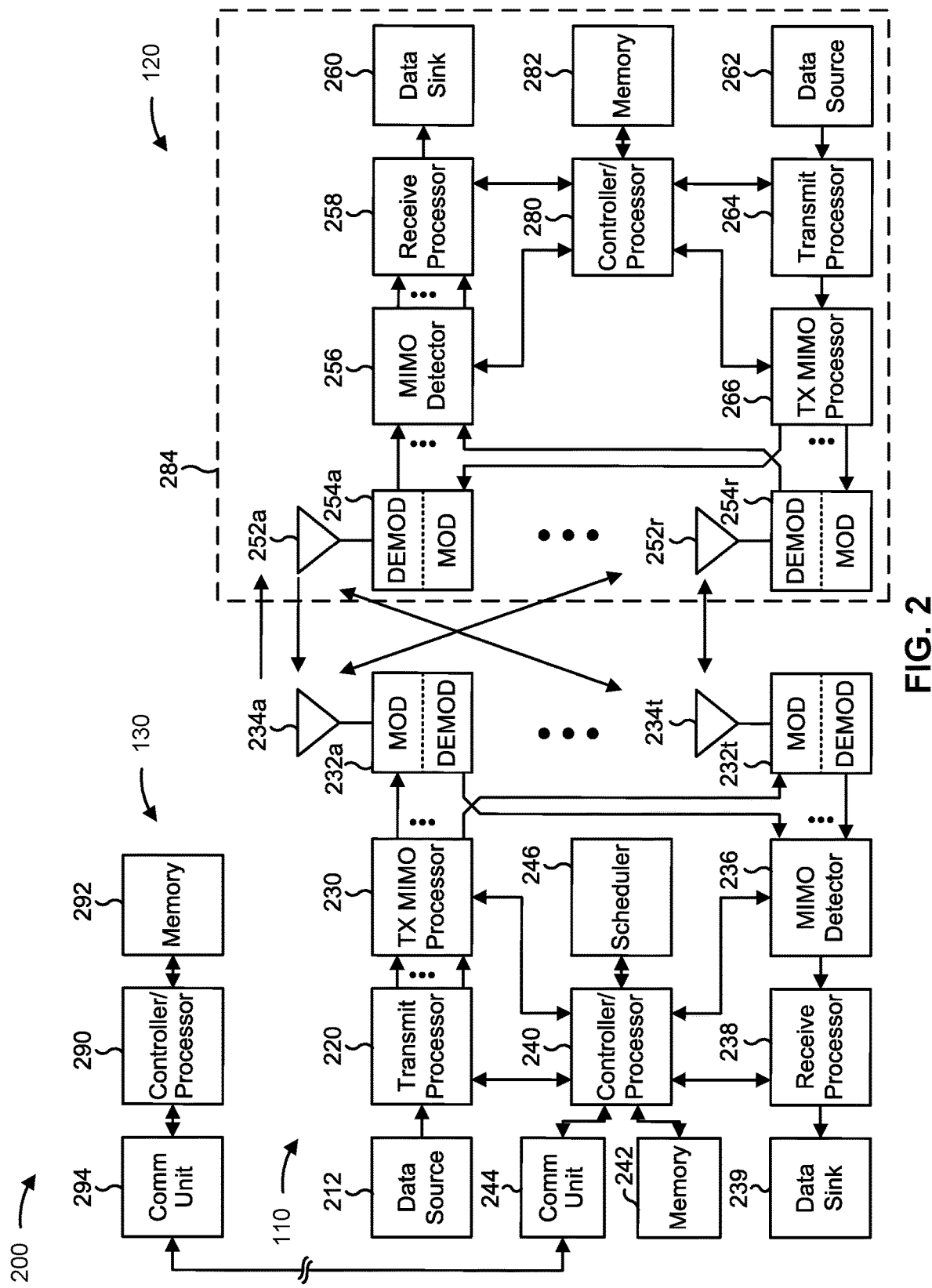
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-8.

Controller/processor 240 of base station 110, controller/processor 280 of UE 120, and/or any other component(s) of FIG. 2 may perform one or more techniques associated with synthesizing an uplink composite beam, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like.

In some aspects, UE 120 may include means for transmitting sounding reference signals (SRSs) on a plurality of beams to a base station using a set of SRS resources indicated by the base station, means for receiving, from the base station, an SRS resource indicator indicating one or more SRS resources of the set of SRS resources, means for determining a combined transmit beam from the plurality of beams based at least in part on the SRS resource indicator, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a set of SRS resources to provide to a UE based at least in part on feedback for one or more signals transmitted to the UE, means for transmitting an indication of the set of SRS resources to the UE for use in beam training, means for determining one or more SRS resources for the UE from the set of SRS resources based at least in part on measurements of SRSs received with the set of SRS resources on a plurality of beams from the UE, means for transmitting an SRS resource indicator to the UE, the SRS resource indicator indicating the one or more SRS resources of the set of SRS resources, means for receiving, from the UE, communications on a combined transmit beam that is combined from a plurality of beams based at least in part on the one or more SRS resources, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
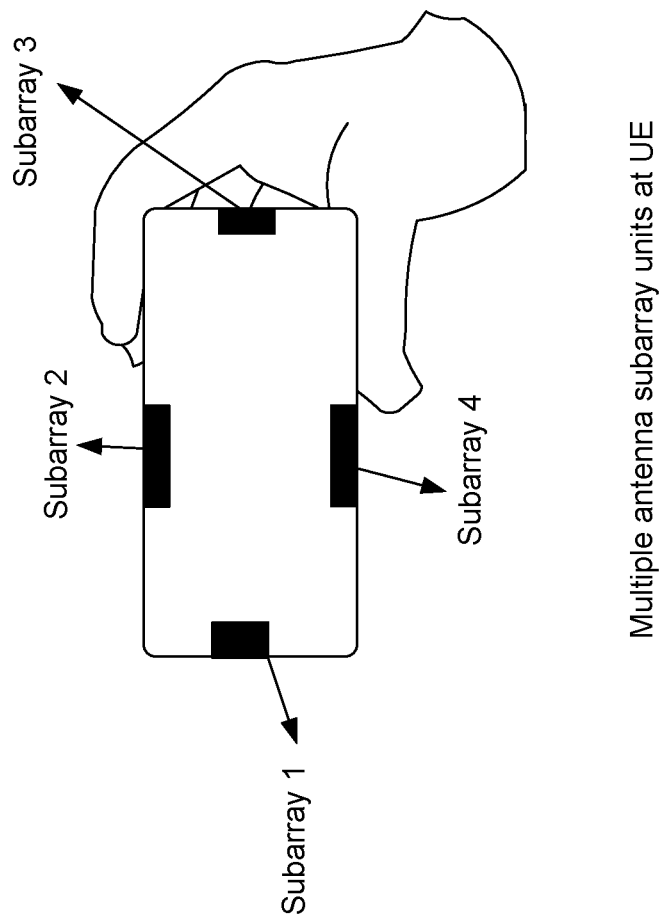
FIG. 3 is a diagram illustrating an example of multiple subarrays for a UE, in accordance with various aspects of the present disclosure.

FIG. 3 is a diagram illustrating an example 300 of multiple subarrays for a UE, in accordance with various aspects of the present disclosure.

FIG. 3 shows a UE with multiple subarrays at different portions of the UE. Each subarray may form a beam in a particular direction. Beamforming in frequency range FR2 may be based on steering energy in a single direction and may include hierarchical beamforming with one or more procedures. Such procedures may involve measurements on different beams and selecting beams for transmission and/or reception based at least in part on the measurements. In some aspects, the UE may simultaneously transmit a plurality of beams from the multiple subarrays.

As indicated above, FIG. 3 is provided as an example. Other examples may differ from what is described with regard to FIG. 3.

Figure 4:
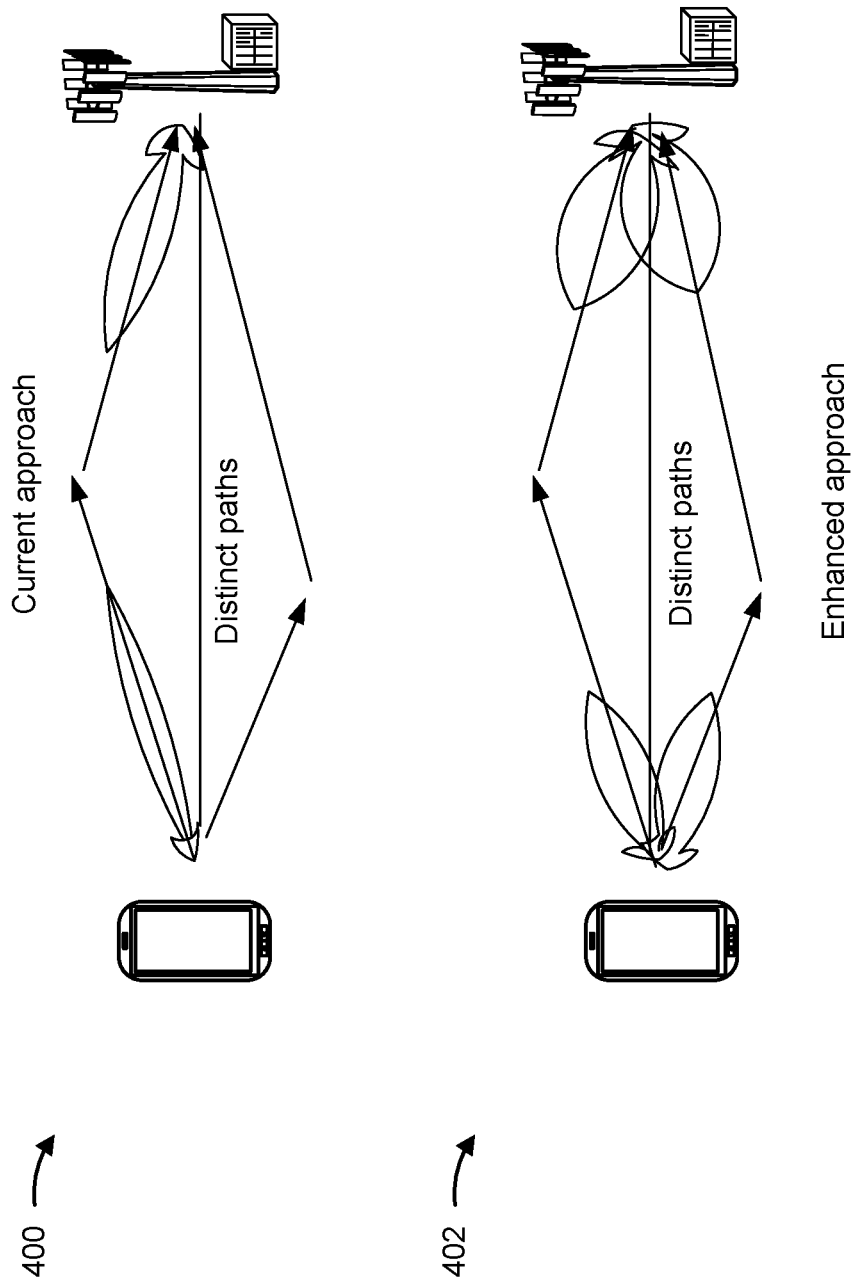
FIG. 4 is a diagram illustrating examples of multiple deflected beams, in accordance with various aspects of the present disclosure.

FIG. 4 is a diagram illustrating examples 400, 402 of multiple deflected beams, in accordance with various aspects of the present disclosure.

A beam may include one or more clusters of transmission energy, and beams may have different beamwidths. A beam with a wider beamwidth may incorporate multiple clusters within the coverage area of that beam, and a beam with a narrower beamwidth may not incorporate multiple clusters. There may be multiple clusters of energy or multiple beams that arrive at a receiver from different angles due to beam reflections off of objects, such as concrete walls, metal buildings, or glass windows.

A UE may detect clusters of energy from different angles or different spatial directions of a channel. The UE may receive a downlink communication by selecting a cluster of energy from a particular direction. The UE may also determine to transmit a communication on an uplink beam in the same direction, as shown by example 400 in FIG. 4. However, if the UE transmits in only a single direction on a single uplink beam, the UE may not transmit uplink communications with a strong signal. As a result, communications with the base station may be degraded. The UE and the base station may waste processing and signaling resources retransmitting signals or otherwise accounting for the degraded communications.

According to various aspects described herein, a UE may synthesize an uplink composite beam to a base station from multiple beams that may be deflected off of objects. The UE may determine the uplink composite beam based at least in part on beam training using SRSs. For example, the base station may indicate a set of SRS resources to the UE, and the UE may transmit SRSs in the set of SRS resources. The base station may determine which SRSs have greater signal strengths and/or greater signal to noise plus interference ratios (SINRs) and transmit an SRS indicator for the SRS resources associated with the SRSs having greater signal strengths or SINRs. The UE may form an uplink composite beam from multiple beams based at least in part on the SRS indicator, as shown by example 402 of FIG. 4. Accordingly, uplink communications transmitted on the uplink composite beam (and reflected off of objects) may be received with a stronger overall signal. As a result, uplink communications to the base station may improve, causing the UE and the base station to conserve processing and signaling resources that would otherwise be consumed retransmitting signals or accounting for degraded communications.

As indicated above, FIG. 4 is provided some examples. Other examples may differ from what is described with regard to FIG. 4.

Figure 5:
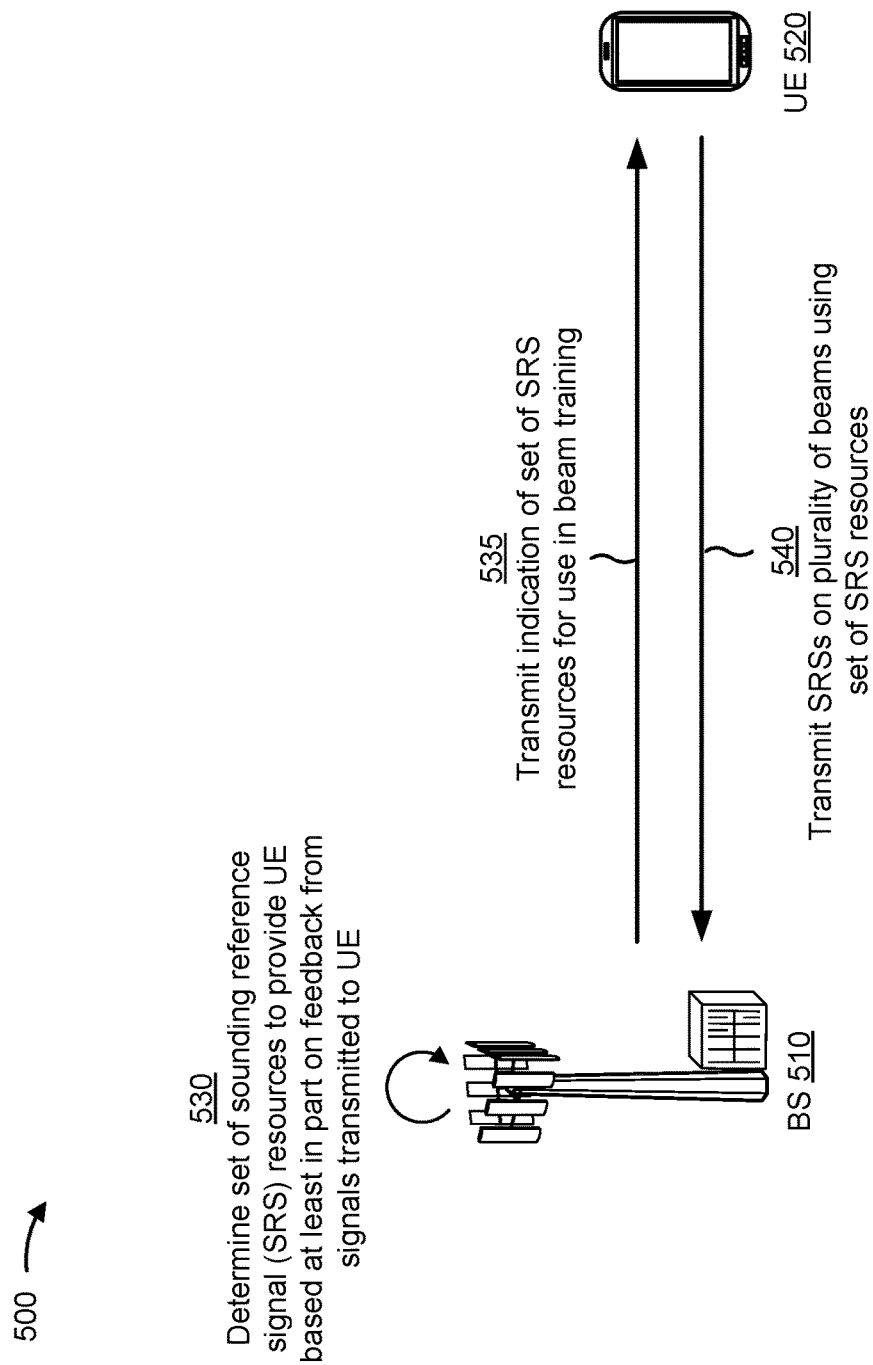
FIG. 5 is a diagram illustrating example of synthesizing an uplink composite beam, in accordance with various aspects of the present disclosure.

FIG. 5 is a diagram illustrating example 500 of synthesizing an uplink composite beam, in accordance with various aspects of the present disclosure. As shown in FIG. 5, example 500 includes communication between a base station (BS) 510 (e.g., a BS 110 depicted in FIGS. 1 and 2) and a UE 520 (e.g., a UE 120 depicted in FIGS. 1 and 2). In some aspects, BS 510 and UE 520 may be included in a wireless network, such as wireless network 100. BS 510 and UE 520 may communicate on a wireless access link, which may include an uplink and a downlink.

As shown by reference number 530, BS 510 may determine a set of SRS resources to provide to a UE based at least in part on feedback for one or more signals transmitted to the UE. The feedback may include feedback for an access procedure, feedback for a random access channel procedure, a channel state information reporting indicator (CRI), and/or the like. BS 510 may transmit an indication of the set of SRS resources for use in beam training to the UE, as shown by reference number 535.

UE 520 may use the set of SRS resources for beam training. The beam training may involve determining which beams are best for communication (e.g., determine a ranking or listing of beams). As shown by reference number 540, UE 520 may transmit SRSs on a plurality of beams using the set of SRS resources, which may involve the SRSs being received on multiple beams. Some SRS resources may be associated with a beam that reflects off a concrete building, and some SRS resources may be associated with another beam that reflects off of glass windows of a different building.

As indicated above, FIG. 5 is provided as an example. Other examples may differ from what is described with regard to FIG. 5.

Figure 6:
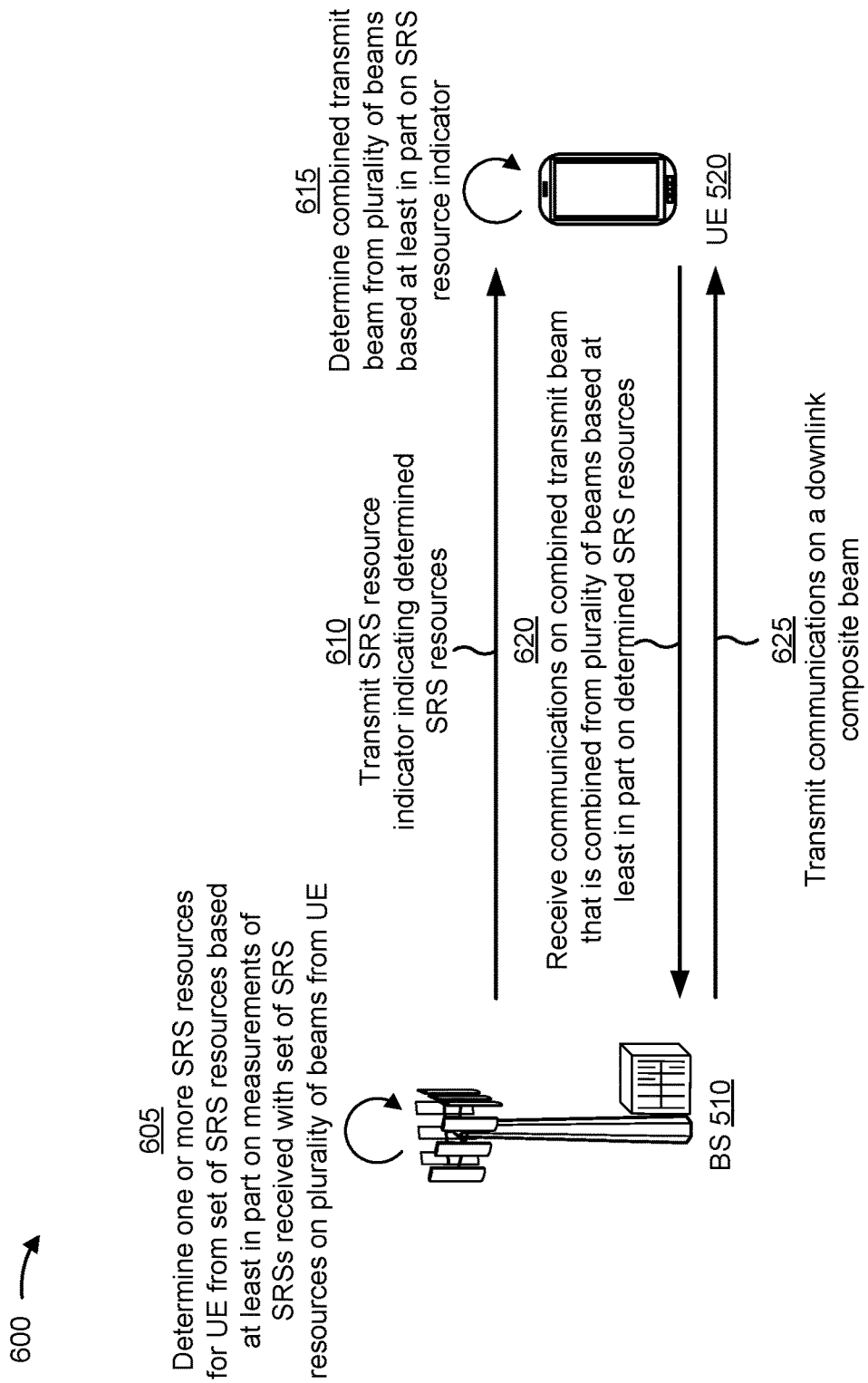
FIG. 6 is a diagram illustrating example of synthesizing an uplink composite beam, in accordance with various aspects of the present disclosure.

FIG. 6 is a diagram illustrating example 600 of synthesizing an uplink composite beam, in accordance with various aspects of the present disclosure. FIG. 6 is a continuation of operations by BS 510 and UE 520 described in connection with FIG. 5.

As shown by reference number 605, BS 510 may determine one or more SRS resources for UE 520 from the set of indicated SRS resources that BS 510 indicated to UE 520 based at least in part on measurements of the SRSs received from UE 520 on multiple beams. The measurements may include signal strength measurements, SINR measurements, and/or the like. UE 520 may have report a best top-K beams in terms of RSRPs and/or SINRs. BS 510 may determine the SRS resources based at least in part on downlink beam training, initial acquisition signals, a random access channel (RACH) message, a channel state information reference signal (CSI-RS), and/or the like. In some aspects, BS 510 may request that UE 520 transmit the set of SRS resources using uplink beams that are quasi co-located with downlink reference signals.

As shown by reference number 610, BS 510 may transmit an SRS resource indicator to UE 520. The SRS resource indicator may indicate the SRS resources that BS 510 determined from the set of SRS resources. UE 520 may determine, based at least in part on the SRS resource indicator, an uplink composite beam that is synthesized from a combination of multiple beams, as shown by reference number 615. UE 520 may determine which beams to combine based at least in part on measurements made by UE 520. For example, UE 520 may combine beams with greater signal strengths, greater SINRs, more reliability, more stability, and/or the like. UE 520 may also combine pairs of beams that may be found to be complementary.

As shown by reference number 620, BS 510 may receive communications on the uplink composite beam. For example, BS 510 may receive information about the uplink composite beam from UE 520 and may receive uplink communications by selecting receive beams that are based at least in part on the uplink composite beam. BS 510 may combine one or more of the best CSI-RS resource indicators (CRIs) or transmission configuration indicator (TCI) states reported by UE 520 (e.g., top-K best). BS 510 may use a Type-II codebook implementation. In some aspects, BS 510 may transmit downlink communications on a downlink composite beam, formed from one or more beams (e.g., top-K best CRI or TCI states, subset of top-K best CRI or TCI states), that corresponds to the uplink composite beam, as shown by reference number 625.

In some aspects, BS 510 may determine combining coefficients for use with the SRS resources and provide them to UE 520. BS 510 may determine a combining coefficient based at least in part on a measurement of signal strength and correlate the combining coefficient with a beam weight. This may be part of or performed in combination with reference number 605. UE 520 may use the combining coefficients to form the uplink composite beam. In some aspects, UE 520 may determine that a beam may be boosted or improved with a particular combining coefficient. For example, a beam with a weak signal but a good SINR may be boosted or weighted heavier for the uplink composite beam with a combining coefficient. In some aspects, UE 520 may determine the uplink composite beam, part of reference number 615, as a linear combination of beam weights of individual beams, with the linear combination generated using the combining coefficients. As a result, the uplink composite beam may be a combination of beams that combine to provide greater signal strength and/or greater accuracy. The uplink composite beam improves communications between BS 510 and UE 520.

As indicated above, FIG. 6 is provided as an example. Other examples may differ from what is described with regard to FIG. 6.

Figure 7:
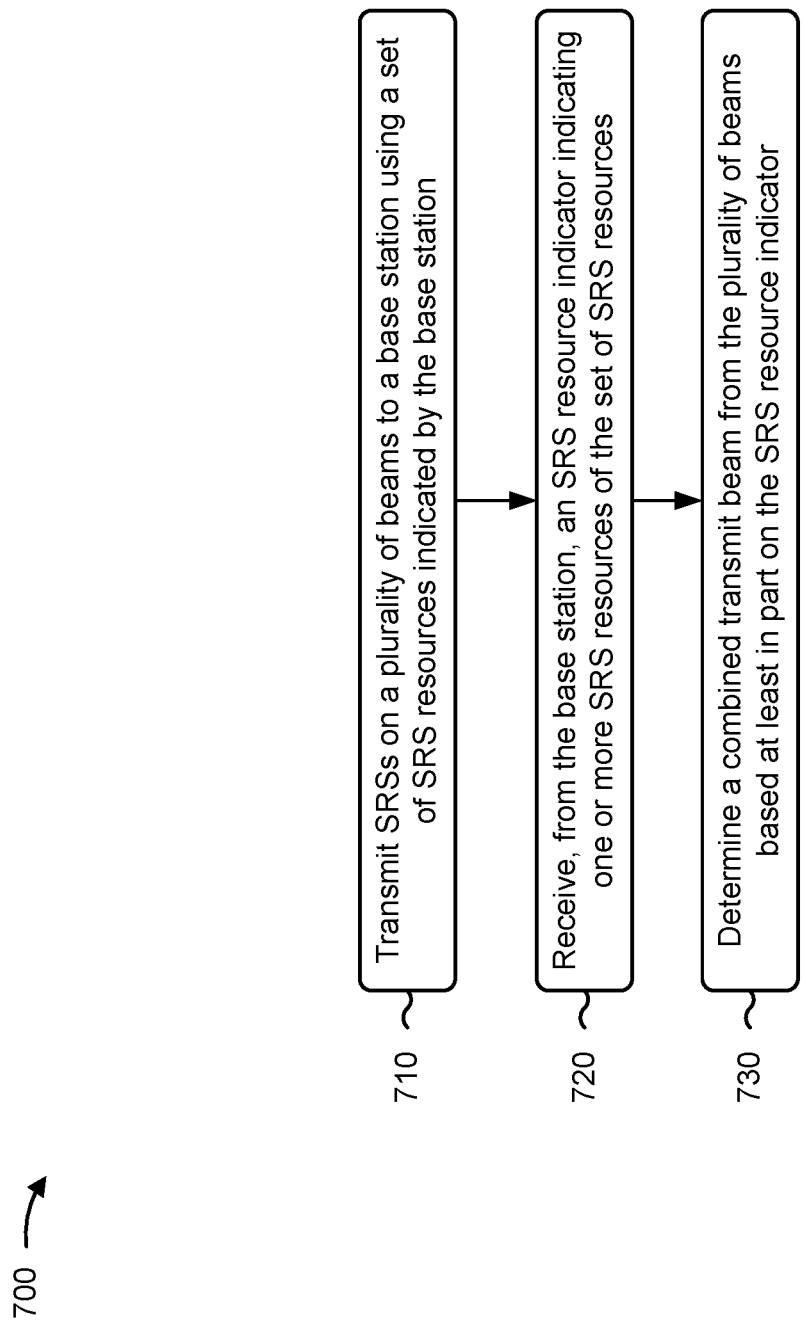
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 depicted in FIGS. 1 and 2, the UE depicted in FIG. 4, UE 520 depicted in FIGS. 5 and 6, and/or the like) performs operations associated with synthesizing an uplink composite beam.

As shown in FIG. 7, in some aspects, process 700 may include transmitting SRSs on a plurality of beams to a base station using a set of SRS resources indicated by the base station (block 710). For example, the UE (e.g., using receive processor 258, transmit processor 264, controller/processor 280, memory 282, and/or the like) may transmit SRSs on a plurality of beams to a base station using a set of SRS resources indicated by the base station, as described above.

As further shown in FIG. 7, in some aspects, process 700 may include receiving, from the base station, an SRS resource indicator indicating one or more SRS resources of the set of SRS resources (block 720). For example, the UE (e.g., using receive processor 258, transmit processor 264, controller/processor 280, memory 282, and/or the like) may receive, from the base station, an SRS resource indicator indicating one or more SRS resources of the set of SRS resources, as described above.

As further shown in FIG. 7, in some aspects, process 700 may include determining a combined transmit beam from the plurality of beams based at least in part on the SRS resource indicator (block 730). For example, the UE (e.g., using receive processor 258, transmit processor 264, controller/processor 280, memory 282, and/or the like) may determine a combined transmit beam from the plurality of beams based at least in part on the SRS resource indicator, as described above.

Process 700 may include additional aspects, such as any single aspect or any combination of aspects described below and/or in connection with one or more other processes described elsewhere herein.

In a first aspect, process 700 includes transmitting communications to the base station using two or more of the plurality of beams as the combined transmit beam.

In a second aspect, alone or in combination with the first aspect, process 700 includes receiving, from the base station, one or more combining coefficients across the one or more SRS resources, where determining the combined transmit beam includes determining the combined transmit beam further based at least in part on the one or more combining coefficients.

In a third aspect, alone or in combination with one or more of the first and second aspects, determining the combined transmit beam includes determining beam weights for respective beams of the plurality of beams and generating the combined transmit beam as a linear combination of the beam weights.

In a fourth aspect, alone or in combination with one or more of the first through third aspects, generating the combined transmit beam as a linear combination of beam weights includes generating the linear combination of beam weights using the one or more combining coefficients.

In a fifth aspect, alone or in combination with one or more of the first through fourth aspects, one or more combining coefficients of the combined transmit beam are weighted towards a strongest beam of the plurality of beams and a second strongest beam of the plurality of beams.

In a sixth aspect, alone or in combination with one or more of the first through fifth aspects, one or more combining coefficients of the combined transmit beam are weighted towards a highest quality or reliability beam of the plurality of beams and a second highest quality or reliability beam of the plurality of beams.

In a seventh aspect, alone or in combination with one or more of the first through sixth aspects, determining the combined transmit beam includes determining two or more of the plurality of beams as the combined transmit beam based at least in part on one or more of a signal strength or a signal to noise ratio of each of the two or more of the plurality of beams.

In an eighth aspect, alone or in combination with one or more of the first through seventh aspects, the combined transmit beam includes at least two beams of the plurality of beams that are complementary. In some aspects, the combined transmit beam is to be transmitted in one or more frequencies in FR2.

In a ninth aspect, alone or in combination with one or more of the first through eighth aspects, the set of SRS resources include SRS resources that are quasi-co-located with different downlink reference signals.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
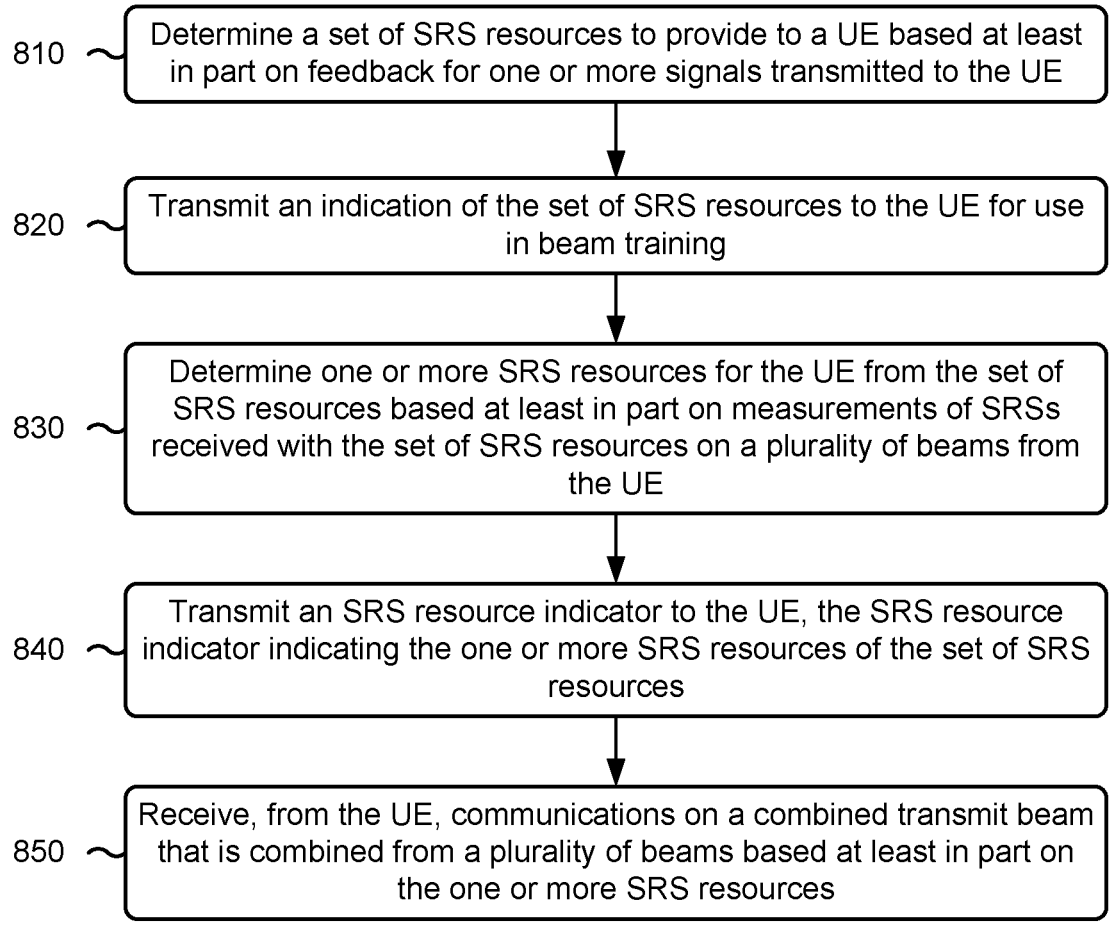
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., base station 110 depicted in FIGS. 1 and 2, the base station depicted in FIG. 4, BS 510 depicted in FIGS. 5 and 6, and/or the like) performs operations associated with synthesizing an uplink composite beam.

As shown in FIG. 8, in some aspects, process 800 may include determining a set of SRS resources to provide to a UE based at least in part on feedback for one or more signals transmitted to the UE (block 810). For example, the base station (e.g., using transmit processor 220, receive processor 238, controller/processor 240, memory 242, and/or the like) may determine a set of SRS resources to provide to a UE based at least in part on feedback for one or more signals transmitted to the UE, as described above.

As further shown in FIG. 8, in some aspects, process 800 may include transmitting an indication of the set of SRS resources to the UE for use in beam training (block 820). For example, the base station (e.g., using transmit processor 220, receive processor 238, controller/processor 240, memory 242, and/or the like) may transmit an indication of the set of SRS resources to the UE for use in beam training, as described above.

As further shown in FIG. 8, in some aspects, process 800 may include determining one or more SRS resources for the UE from the set of SRS resources based at least in part on measurements of SRSs received with the set of SRS resources on a plurality of beams from the UE (block 830). For example, the base station (e.g., using transmit processor 220, receive processor 238, controller/processor 240, memory 242, and/or the like) may determine one or more SRS resources for the UE from the set of SRS resources based at least in part on measurements of SRSs received with the set of SRS resources on a plurality of beams from the UE, as described above.

As further shown in FIG. 8, in some aspects, process 800 may include transmitting an SRS resource indicator to the UE, the SRS resource indicator indicating the one or more SRS resources of the set of SRS resources (block 840). For example, the base station (e.g., using transmit processor 220, receive processor 238, controller/processor 240, memory 242, and/or the like) may transmit an SRS resource indicator to the UE, the SRS resource indicator indicating the one or more SRS resources of the set of SRS resources, as described above.

As further shown in FIG. 8, in some aspects, process 800 may include receiving, from the UE, communications on a combined transmit beam that is combined from a plurality of beams based at least in part on the one or more SRS resources (block 850). For example, the base station (e.g., using transmit processor 220, receive processor 238, controller/processor 240, memory 242, and/or the like) may receive, from the UE, communications on a combined transmit beam that is combined from a plurality of beams based at least in part on the one or more SRS resources, as described above.

Process 800 may include additional aspects, such as any single aspect or any combination of aspects described below and/or in connection with one or more other processes described elsewhere herein.

In a first aspect, process 800 includes determining one or more combining coefficients across the one or more SRS resources to be used by the UE for determining the combined transmit beam and transmitting the one or more combining coefficients to the UE.

In a second aspect, alone or in combination with the first aspect, determining the one or more combining coefficients includes determining the one or more combining coefficients based at least in part on a reference signal received power or a signal to noise ratio for one or more of the plurality of beams.

In a third aspect, alone or in combination with one or more of the first and second aspects, the feedback includes one or more of feedback for a random access channel procedure, feedback for an initial access procedure, or a channel state information reference signal.

In a fourth aspect, alone or in combination with one or more of the first through third aspects, determining the one or more SRS resources and transmitting the SRS resource indicator includes using a type-II codebook, and the combined transmit beam is received in one or more frequencies in FR2.

In a fifth aspect, alone or in combination with one or more of the first through fourth aspects, the set of SRS resources include SRS resources that are quasi-co-located with different downlink reference signals.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network node, an indication of a plurality of sounding reference signal (SRS) resources associated with a random access channel (RACH) message;
   transmitting, to the network node, using the plurality of SRS resources, and on a plurality of beams, measurements of SRSs, wherein the measurements of SRSs comprise at least one of signal strength measurements of SRSs or signal to noise plus interference ratio (SINR) measurements of the SRSs;
   receiving, from the network node and based at least in part on transmitting the measurements of SRSs:
      an SRS resource indicator, indicating the plurality of SRS resources, and
      a plurality of combining coefficients, across the plurality of SRS resources, associated with a plurality of beam weights associated with the plurality of beams;
   determining, based at least in part on receiving the plurality of combining coefficients, that:
      a first beam, of the plurality of beams, is improved with a first combining coefficient of the plurality of combining coefficients, and
      a second beam, of the plurality of beams, is improved with a second combining coefficient of the plurality of combining coefficients;
   determining, based at least in part on the SRS resource indicator, an uplink composite beam as a linear combination of a first beam weight, corresponding to the first combining coefficient and the first beam, and a second beam weight, corresponding to the second combining coefficient and the second beam, wherein each of the first beam weight and the second beam weight is associated with at least one of a respective signal strength or a respective SINR; and generating, using the first combining coefficient and the second combining coefficient, the uplink composite beam.

2. The method of claim 1, further comprising transmitting communications to the network node using the uplink composite beam.

3. The method of claim 1, wherein the plurality of combining coefficients are weighted towards a first strongest beam of the plurality of beams and a second strongest beam of the plurality of beams.

4. The method of claim 1, wherein the plurality of combining coefficients are weighted towards a first highest reliability beam of the plurality of beams and a second highest reliability beam of the plurality of beams.

5. The method of claim 1, wherein the uplink composite beam is generated further based at least in part on a signal strength of the first beam and the second beam.

6. The method of claim 1, wherein the first beam and the second beam are complementary to each other.

7. The method of claim 1, wherein the plurality of SRS resources are quasi-co-located with different downlink reference signals.

8. The method of claim 7, further comprising receiving a request to transmit the plurality of SRS resources using uplink beams that are quasi-co-located with the different downlink reference signals.

9. The method of claim 1, further comprising:
transmitting feedback on one or more signals received from the network node,
wherein the indication of the plurality of SRS resources is received based at least in part on transmitting the feedback.

10. The method of claim 1, wherein the measurements of SRSs comprise the signal strength measurements of the SRSs and the SINR measurements of the SRSs.

11. A user equipment (UE) for wireless communication, comprising:
one or more memories; and
one or more processors coupled to the one or more memories, the one or more processors configured to:
receive, from a network node, an indication of a plurality of sounding reference signal (SRS) resources;
transmit, to the network node, using the plurality of SRS resources, and on a plurality of beams, measurements of SRSs, wherein the measurements of SRSs comprise at least one of signal strength measurements of SRSs or signal to noise plus interference ratio (SINR) measurements of the SRSs;
receive, from the network node and based at least in part on transmitting the measurements of SRSs:
an SRS resource indicator, indicating the plurality of SRS resources associated with at least one of an initial acquisition signal or a random access channel (RACH) message, and
a plurality of combining coefficients, across the plurality of SRS resources, associated with a plurality of beam weights associated with the plurality of beams;
determine, based at least in part on receiving the plurality of combining coefficients, that:
a first beam, of the plurality of beams, is improved with a first combining coefficient of the plurality of combining coefficients, and a second beam, of the plurality of beams, is improved with a second combining coefficient of the plurality of combining coefficients;
determine, based at least in part on the SRS resource indicator, an uplink composite beam as a linear combination of a first beam weight, corresponding to the first combining coefficient and the first beam, and a second beam weight, corresponding to the second combining coefficient and the second beam, wherein each of the first beam weight and the second beam weight is associated with at least one of a respective signal strength or a respective SINR; and
generate, using the first combining coefficient and the second combining coefficient, the uplink composite beam.

12. The UE of claim 11, wherein the one or more processors are further configured to transmit communications to the network node using the uplink composite beam.

13. The UE of claim 11, wherein the plurality of combining coefficients are weighted towards a first strongest beam of the plurality of beams and a second strongest beam of the plurality of beams.

14. The UE of claim 11, wherein plurality of combining coefficients are weighted towards a first highest reliability beam of the plurality of beams and a second highest reliability beam of the plurality of beams.

15. The UE of claim 11, wherein the uplink composite beam is generated further based at least in part on of a signal strength of the first beam and the second beam.

16. The UE of claim 11, wherein the plurality of SRS resources that are quasi-co-located with different downlink reference signals.

17. The UE of claim 16, wherein the one or more processors are further configured to receive a request to transmit the plurality of SRS resources using uplink beams that are quasi-co-located with the different downlink reference signals.

18. The UE of claim 11, wherein the first beam and the second beam are complementary to each other.

19. The UE of claim 11, wherein the one or more processors are further configured to:
transmit feedback on one or more signals received from the network node,
wherein the indication of the plurality of SRS resources is received based at least in part on transmitting the feedback.

20. The UE of claim 11, wherein the measurements of SRSs comprise the signal strength measurements of the SRSs and the SINR measurements of the SRSs.

21. A non-transitory computer-readable medium storing a set of instructions for wireless communication, the set of instructions comprising:
one or more instructions that, when executed by one or more processors of a user equipment (UE), cause the UE to:
receive, from a network node, an indication of a plurality of sounding reference signal (SRS) resources associated with a random access channel (RACH) message;
transmit, to the network node, using the set of SRS resources, and on a plurality of beams, measurements of SRSs, wherein the measurements of SRSs comprise at least one of signal strength measurement of SRSs or signal to noise plus interference ratio (SINR) measurements of the SRSs;
receive, from the network node and based at least in part on transmitting the measurements of SRSs:

an SRS resource indicator indicating the plurality of SRS resources, and a plurality of combining coefficients, across the plurality of SRS resources, associated with a plurality of beam weights associated with the plurality of beams;

determine, based at least in part on receiving the one or more combining coefficients, that:

a first beam, of the plurality of beams, is improved with a first combining coefficient of the plurality of combining coefficients, and a second beam, of the plurality of beams, is improved with a second combining coefficient of the plurality of combining coefficients;

determine, based at least in part on the SRS resource indicator, an uplink composite beam as a linear combination of a first beam weight, corresponding to the first combining coefficient and the first beam, and a second beam weight, corresponding to the second combining coefficient and the second beam, wherein each of the first beam weight and the second beam weight is associated with at least one of a respective signal strength or a respective SINR; and generate, using the first combining coefficient and the second combining coefficient, the uplink composite beam.

22. The non-transitory computer-readable medium of claim 21, wherein the one or more instructions, when executed by the one or more processors, further cause the UE to transmit communications to the network node using the uplink composite beam.

23. The non-transitory computer-readable medium of claim 21, wherein the plurality of combining coefficients are weighted towards a first strongest beam of the plurality of beams and a second strongest beam of the plurality of beams.

24. The non-transitory computer-readable medium of claim 21, wherein the plurality of combining coefficients are weighted towards a first highest reliability beam of the plurality of beams and a second highest reliability beam of the plurality of beams.

25. The non-transitory computer-readable medium of claim 21, wherein the uplink composite beam is generated further based at least in part on a signal strength of the first beam and the second beam.

26. The non-transitory computer-readable medium of claim 21, wherein the plurality of SRS resources that are quasi-co-located with different downlink reference signals.

27. The non-transitory computer-readable medium of claim 26, wherein the one or more instructions that, when executed by the one or more processors of the UE, further cause the UE to receive a request to transmit the plurality of SRS resources using uplink beams that are quasi-co-located with the different downlink reference signals.

28. The non-transitory computer-readable medium of claim 21, wherein the measurements of SRSs comprise the signal strength measurements of the SRSs and the SINR measurements of the SRSs.

29. An apparatus for wireless communication, comprising means for receiving, from a network node, an indication of a set of sounding reference signal (SRS) resources associated with a random access channel (RACH) message;

means for transmitting, to the network node, using the set of SRS resources, and on a plurality of beams, measurements of SRSs, wherein the measurements of SRSs comprise at least one of signal strength measurement of SRSs or signal to noise plus interference ratio (SINR) measurements of the SRSs;

means for receiving, from the network node and based at least in part on transmitting the measurements of SRSs:

an SRS resource indicator indicating the plurality of SRS resources, and a plurality of combining coefficients, across the plurality of SRS resources, associated with a plurality of beam weights associated with the plurality of beams;

means for determining, based at least in part on receiving the plurality of combining coefficients, that:

a first beam, of the plurality of beams, is improved with a first combining coefficient of the plurality of combining coefficients, a second beam, of the plurality of beams, is improved with a second combining coefficient of the plurality of combining coefficients;

means for determining, based at least in part on the SRS resource indicator, an uplink composite beam, as a linear combination of a first beam weight, corresponding to the first combining coefficient and the first beam, and a second beam weight, corresponding to the second combining coefficient and the second beam, wherein each of the first beam weight and the second beam weight is associated with at least one of a respective signal strength or a respective SINR; and means for generating, using the first combining coefficient the second combining coefficient, an uplink composite beam.

30. The apparatus of claim 29, further comprising means for receiving a request to transmit the plurality of SRS resources using uplink beams that are quasi-co-located with different downlink reference signals.

* * * * *